May 13, 1952  D. G. KASPER  2,596,775
STORE BASKET AND CARRIAGE
Filed Dec. 19, 1949  2 SHEETS—SHEET 1
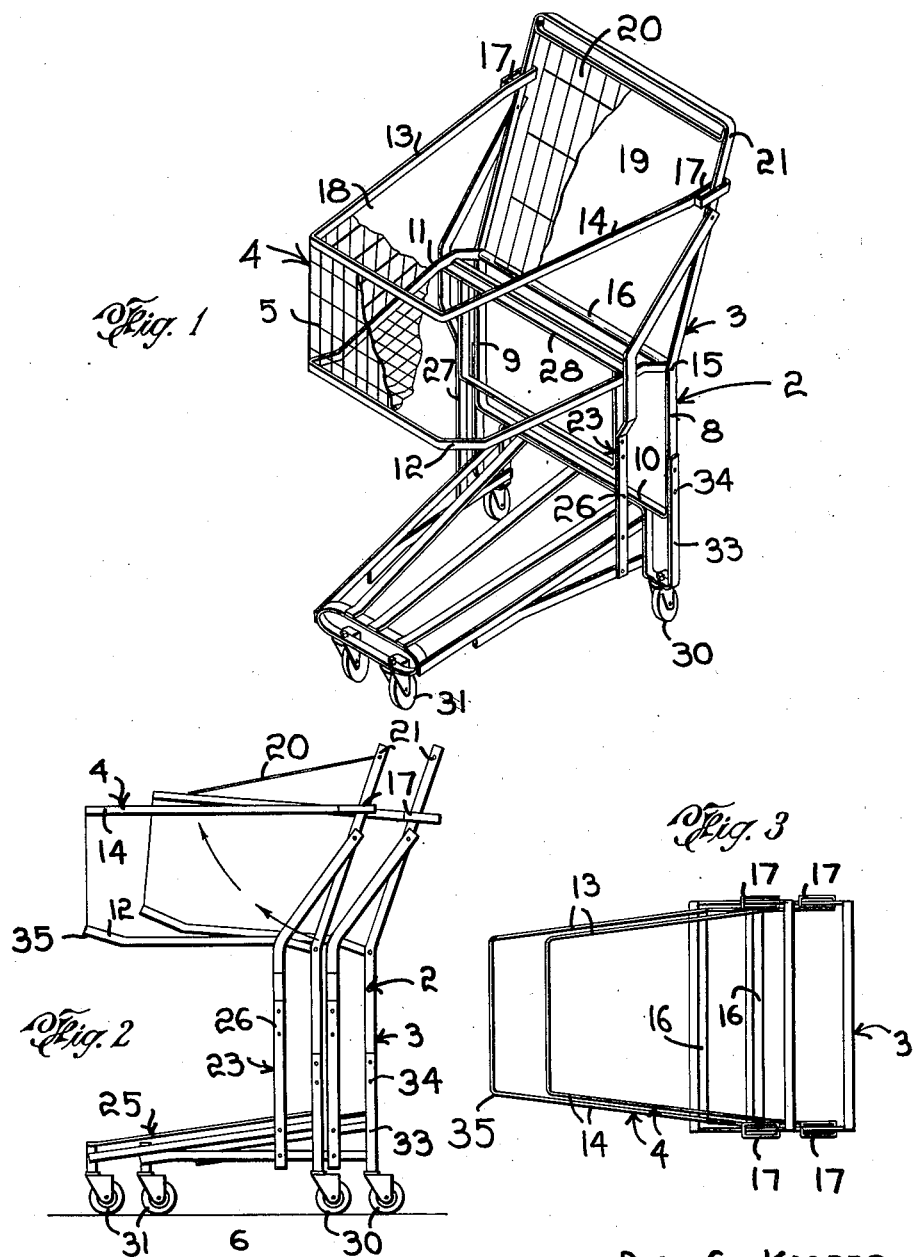
Don G Kasper
INVENTOR.
BY Lester B. Clark
 & Ray L. Smith
ATTORNEYS

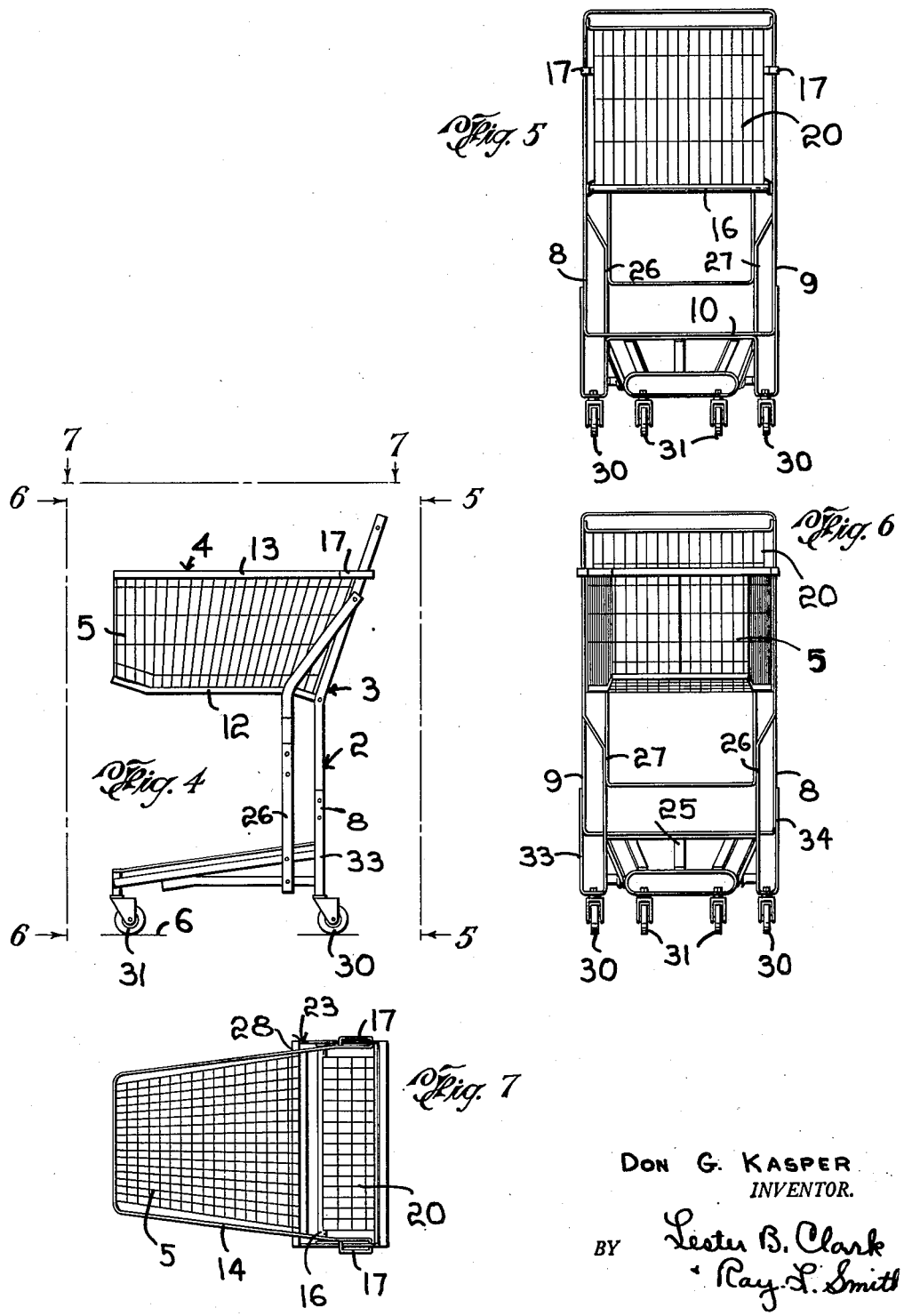

Patented May 13, 1952

2,596,775

UNITED STATES PATENT OFFICE 2,596,775

STORE BASKET AND CARRIAGE

Don G. Kasper, Shiner, Tex.

Application December 19, 1949, Serial No. 133,820

8 Claims. (Cl. 280—50)

The invention relates to a basket carriage and more particularly to store basket carriages which may be telescoped in basket carriages of like construction.

An object of the present invention is to provide a store basket carriage which comprises a substantially upright portion and a forwardly extended portion pivotally secured to such upright portion, there being a basket mounted on such forwardly extended portion which is so constructed to telescope in baskets on carriages of like construction.

Another object of the invention is to provide a wheeled carriage with a basket support and basket thereon, which is so constructed and arranged to telescope into basket carriages of like construction and a roller on the wheeled carriage to facilitate the nesting of and removal of the telescoped baskets one from the other.

A still further object of the invention is to provide a wheeled carriage which comprises a substantially upright portion and a forwardly extended portion substantially horizontal to the surface over which the wheeled carriage rolls, such forwardly extended portion being pivotally secured to said upright portion whereby the forwardly extended portion may be tilted and nested within a basket carriage of like construction.

A still further object of the invention is to provide a wheeled carriage which comprises a substantially upright portion and a forwardly extended portion substantially horizontal to the surface over which the wheeled carriage rolls, such forwardly extended portion being pivotally secured to said upright portion whereby the forwardly extended portion may be tilted and nested within a basket carriage of like construction, and a roller secured to the upright portion adjacent the point of juncture of such upright portion and the forwardly extended portion to facilitate the entry of such forwardly extended portion and the removal of such forwardly extended portion from nested positions in carriages of like construction.

Other objects and advantages will become more readily apparent from a consideration of the following description and drawings wherein:

Fig. 1 is a perspective view showing the preferred embodiment of the invention,

Fig. 2 is a side view of the wheeled carriage frame,

Fig. 3 is a top plan view showing the preferred construction of the wheeled carriage frame, Fig. 4 is a side elevation of the wheeled carriage with a basket mounted thereon, Fig. 5 is a rear elevation taken on the line 5—5 of Fig. 4, Fig. 6 is a front elevation taken on the line 6—6 of Fig. 4, Fig. 7 is a top plan view taken on the line 7—7 of Fig. 4.

Several objections are present in nested store basket constructions on the market at the present date. One of such objections lies in the fact that the basket is mounted at an angle with respect to the frame on which it is supported. This presents an unpleasant effect to the observer's eye and additionally, articles placed in the bottom of the basket slide toward the rearward portion thereof because of such inclination.

Another objection to present day constructions is the fact that once the carriages are nested together, they are inclined to become stuck and it is somewhat difficult at times to separate such nested baskets. The present invention is therefore directed to a construction which not only facilitates the nesting of the basket carriages one within the other, but also facilitates the ease of separation of such baskets after they have remained in such nested position for a length of time. Also the present construction is such that the basket supported thereupon is retained substantially horizontal to the surface over which the wheeled carriage is adapted to roll which obviates the unpleasant effect to an observer's eye, and prevents articles placed therein from sliding rearwardly in the basket. Additionally, the construction is such that the basket carriages and basket supported thereon may be readily and easily nested in a basket carriage of like construction.

As shown in Fig. 4, the basket carriage comprises the wheel supported frame denoted generally by the numeral 2 which comprises the upright portion 3 and a forwardly extended portion 4 secured to the upright portion 3. Normally the basket 5 mounted on the forwardly extended portion will rest in a horizontal relationship with the surface 6 over which the carriage 2 is moved. However, as illustrated in Fig. 2, the forwardly extended portion 4 is adapted to tilt upwardly to permit nesting of one basket carriage in other basket carriages of like construction.

As clearly illustrated in Fig. 1 the upright portion 3 comprises spaced upright side frame members 8 and 9. The support 10 connects the upright side members 8 and 9 together and sustains them in spaced relation.

Extending forwardly from the spaced upright side members 8 and 9 are the lower basket support members 11 and 12. Spaced from such lower basket support members are the upper basket support members 13 and 14. The lower basket support members are pivotally secured or connected to the spaced upright side members 8 and 9 respectively as shown at 15 and a roller 16 is mounted between the spaced upright side frame members 8 and 9 at the point of juncture of the lower basket support members 11 and 12 with such side frame members. The upper basket support members are provided with a slip connection 17 to allow movement between the upper support members 13 and 14 and lower support members 11 and 12 relative to the spaced upright side frame members 8 and 9. In order to retain the lower basket support members 11 and 12 in spaced relation with the upper basket support members 13 and 14, any suitable means may be used, and if desired a basket 5 may be positioned on the lower support members 11 and 12 and secured to the upper support members 13 and 14 in any suitable manner so that such basket, while normally being retained on a horizontal plane relative to the surface over which the carriage is rolled, will move in unison and tilt upwardly as the basket members 11, 12, 13 and 14 are tilted.

It is to be noted that the lower basket support members 11 and 12 are forwardly inclined toward one another as more clearly illustrated in Fig. 3. Similarly, the upper support members 13 and 14 are also forwardly inclined toward one another as seen in Fig. 3. The basket 5 may be of any suitable size to fit within the area defined by the members 11, 12, 13 and 14 and is preferably of the type which has an open top 18 and an open end 19, a closure 20 for the open end 19 of the basket 5 which is pivotally connected to the upright side frame members 8 and 9 at 21. This closure is adapted to pivot forwardly and up toward the open top of said basket when carriages of like construction are nested together as illustrated in Fig. 2. A stop rest 23 to support the lower basket support members 11 and 12 is shown as being connected to the spaced upright side frame members 8 and 9 and may extend downwardly to the forwardly extended frame member denoted generally by the numeral 25 if desired to afford additional rigidity and strength to the carriage construction. Such stop rest 23 includes the spaced upright side arms 26 and 27 with the connecting bar 28 therebetween to retain them in spaced relation and to engage the nether side of the lower basket support members 11 and 12 to sustain them in horizontal position. The forwardly extended frame members 25 are secured to the lower portion of the spaced upright side frame members 8 and 9 and extend from such side frame members in the same direction as the basket support members 11, 12, 13 and 14. The forwardly extended frame members 25 are inclined so that their width at their forward end is smaller than the distance between the side frame members 8 and 9.

Support rollers 30 and 31 are mounted on the lower portion 33 of the spaced upright side frame members 8, 9, and the forward end of the forwardly extended frame member 25 respectively. The lower portion 33 of the side frame members 8 and 9 is secured to such side frame members 8 and 9 by any suitable means such as screws or nuts 34.

While it is believed the operation of the invention to be apparent from the foregoing description, by way of amplification and further illustration, it will be assumed that a shopper has moved the carriage about the floor of a store from point to point until all purchases are completed. After the basket has been emptied of such purchases, it is then ready to be stored until reused. Such carriage may be nested in a carriage of like construction whereby less floor is occupied than if the carriages were stored side by side. To this end, when the forward end 35 of the lower basket support members 11 and 12 engage the roller 16 of a basket carriage of like construction, such support members 11 and 12 will pivot upwardly about the point 15 whereupon the members 13 and 14 move relative to the spaced upright side frame members 8 and 9 by reason of the slip connection 17. This allows one carriage to be telescoped into another as illustrated in Fig. 2 of the drawings. Of course, the closure 20 pivots forwardly and up toward the open end 18 of the basket 5 as the end 35 of the lower support members 11 and 12 are engaged thereagainst. Upon withdrawal of one basket carriage from another the closure 20 will again move to position in the open end 19 of the basket 5. The stop rest 23, of course limits downward movement of the lower basket support members 11 and 12 and sustains them in position while the basket is in normal use.

Particular attention is directed to this construction which provides a roller 16 at the point of juncture of the lower support members 11 and 12 with the spaced upright side frame members 8 and 9. This roller facilitates the nesting of one basket construction in other basket carriages of like construction. Additionally, as these carriages are removed from their nesting position, the lower support members 11 and 12 ride upon the roller during such withdrawal thereby facilitating ease with which the basket carriages are separated.

Also it is to be noted that the support members 11 and 12 are not tilted or inclined relative to the surface over which the carriage is adapted to be rolled, but rather they are in horizontal relationship with such surface. This overcomes the objection of previous constructions of this sort which not only presented an unpleasant effect to an observer's eye, but which caused all merchandise placed in the bottom of the carriage to slide toward the rear portion of such basket.

Broadly, the invention contemplates a basket carriage and basket construction which includes an upright portion and a forwardly extended portion pivotally secured to such upright portion and the forwardly extended portion being tapered inwardly toward its forward end so that it is of a smaller width at the forward end whereby it will pass through the upright portion of similar basket carriages, whereby they may be telescoped together.

What is claimed is:

1. A store carriage comprising a wheeled frame having upright spaced side frame members, supports sustaining said side frame members in spaced relation, supporting rollers mounted on the lower end of said frame members, forwardly extending frame members mounted on the lower end of said frame members, supporting rollers mounted on the forward end of said forwardly extending frame members, upper and lower basket supporting members extending forwardly from said side frame members, said lower basket support member being pivotally mounted on said side frame members, and said upper basket support having a slip connection with said side frame member whereby said upper and lower basket support members may be tilted upwardly to telescope into other store carriages of like construction.

2. A store carriage comprising a wheeled frame having upright spaced side frame members, a support sustaining said side frame members in spaced relation, supporting rollers mounted on the lower end of said frame members, forwardly extending frame members mounted on the lower end of said frame members, supporting rollers mounted on the forward end of said forwardly extending frame members, upper and lower basket supporting members extending forwardly from said side frame members, said lower basket support member being pivotally mounted on said side frame members, and said upper basket support having a slip connection with said side frame member whereby said upper and lower basket support members may be tilted upwardly to telescope into other store carriages of like construction, and a stop rest secured to said side frame members to support said lower basket support member.

3. A store basket carriage comprising a wheeled frame having upright spaced side frame members, supports sustaining said side frame members, supporting rollers mounted on said side frame members to support the carriage, spaced upper and lower basket supporting members extended forwardly from said side frame members, said upper basket support members being forwardly inclined towards one another and said lower basket support members being forwardly inclined towards one another, supports sustaining said upper and lower basket supporting members in spaced relation, a roller mounted between said side frame members at the point of juncture of said lower basket support members with said side frame members, said lower basket support members being pivotally secured to said side frame members at their point of juncture, said upper basket member having a slip connection with said side frame members, whereby said upper and lower basket support members may be tilted upwardly to telescope into other store carriages of like construction.

4. A basket carriage comprising a wheeled frame said frame including, spaced upright side members, supports sustaining said side members in spaced relation, forwardly extending frame members connected to said side members adjacent the lower end, said forwardly extending frame members being forwardly tapered towards one another, supporting rollers mounted on said side members and on said forwardly extending frame members spaced upper and lower basket support members extending forwardly from said side members, said upper basket support members being forwardly inclined towards each other and said lower basket support members being forwardly inclined towards each other, supports sustaining said upper and lower basket support members in spaced relation, a roller extending between said side frame members at the point of juncture of said lower basket support members with said side frame members, said lower basket support members being pivotally connected to said side frame members at the point of their juncture, a stop rest secured to said side frame members and to said forwardly extending frame members to support said pivotally mounted lower basket support member, said upper basket member having a slip connection with said side frame members, whereby said basket support members may be tilted upwardly when the forward end of said lower support member contacts the roller extending between the side frame members of other basket carriages of like construction to nest such basket carriages within each other.

5. A store basket carriage comprising a wheeled frame having upright spaced side frame members, supports sustaining said side frame members, supporting rollers mounted on said side frame members to support the carriage, spaced upper and lower basket supporting members extended forwardly from said side frame members, said upper basket support members being forwardly inclined towards one another and said lower basket support members being forwardly inclined towards one another, supports sustaining said upper and lower basket supporting members in spaced relation, a roller mounted between said side frame members at the point of juncture of said lower basket support members with said side frame members, said lower basket support members being pivotally secured to said side frame members at their point of juncture, said upper basket member having a slip connection with said side frame members, whereby said upper and lower basket support members may be tilted upwardly to telescope into other store carriages of like construction, and a stop rest secured to said side frame members to support said lower basket support member.

6. A basket carriage comprising a wheel supported frame having an approximately upright portion and a forwardly extending portion, said forwardly extended portion being smaller at its forward end and of a width to pass through the upright portion of a carriage of like construction, a basket mounted on said forwardly extended portion and having an open rear end, said forwardly extended portion being pivotally connected to said upright portion, by virtue of which the forwardly extended portion and basket of one carriage will nest within the forwardly extended portion and basket of like construction while the carriages are nested together, and a roller on said upright portion adjacent said forwardly extended portion to facilitate the nesting of and removal of said forwardly extended portion and basket in carriages of like construction.

7. A basket carriage comprising a wheel supported frame having an approximately upright portion and a forwardly extending portion, said forwardly extended portion being smaller at its forward end and of a width to pass through the upright portion of a carriage of like construction, a basket mounted on said forwardly extended portion and having an open rear end, said forwardly extended portion being pivotally connected to said upright portion, by virtue of which the forwardly extended portion and basket of one carriage will nest within the forwardly extended portion and basket of like construction while the carriages are nested together, a stop rest to support said pivotally connected forwardly extended portion, and a roller on said upright portion adjacent said forwardly extended portion to facilitate the nesting of and removal of said forwardly extended portion and basket in carriages of like construction.

8. A basket carriage comprising a wheeled frame said frame including, spaced upright side members, supports sustaining said side members in spaced relation, forwardly extending frame members connected to said side members adjacent the lower end, said forwardly extending frame members being forwardly tapered towards one another, supporting rollers mounted on said side members and on said forwardly extending frame members spaced upper and lower basket support members extending forwardly from said side members, said upper basket support members being forwardly inclined towards each other and said lower basket support members being forwardly inclined towards each other, a basket mounted between said upper and lower basket members to sustain them in spaced relation, said basket having an open top and end, a closure for said open end pivotally secured to said side frame members and adapted to pivot forwardly and up toward the open top of said basket, a roller extending between said side frame members at the point of juncture of said lower basket support members with said side frame members, said lower basket support members being pivotally connected to said side frame members at the point of their juncture, a stop rest secured to said side frame members and to said forwardly extending frame members to support said pivotally mounted lower basket support member, said upper basket member having a slip connection with said side frame members, whereby said basket support members may be tilted upwardly when the forward end of said lower support member contacts the roller extending between the side frame members of other basket carriages of like construction to nest such basket carriages within each other.

DON G. KASPER.

REFERENCES CITED

The following references are of record in the file of this patent:

UNITED STATES PATENTS

| Number | Name | Date |
|---|---|---|
| 2,234,358 | Schray | Mar. 11, 1941 |
| 2,479,530 | Watson | Aug. 16, 1949 |